United States Patent
Steigleder et al.

(10) Patent No.: US 7,262,147 B2
(45) Date of Patent: Aug. 28, 2007

(54) METHOD FOR PREPARING DEHYDROCYCLODIMERIZATION CATALYST

(75) Inventors: Karl Z. Steigleder, Glen Ellyn, IL (US); Veronica M. Godfrey, Wheaton, IL (US); Kerry O. Boehner, Bethel Park, PA (US)

(73) Assignee: UOP LLC, Des Plaines, IL (US)

( * ) Notice: Subject to any disclaimer, the term of this patent is extended or adjusted under 35 U.S.C. 154(b) by 486 days.

(21) Appl. No.: 10/726,203

(22) Filed: Dec. 2, 2003

(65) Prior Publication Data

US 2005/0059544 A1    Mar. 17, 2005

Related U.S. Application Data

(60) Continuation of application No. 10/113,689, filed on Mar. 29, 2002, now Pat. No. 6,657,096, which is a division of application No. 09/244,725, filed on Feb. 5, 1999, now Pat. No. 6,395,664.

(60) Provisional application No. 60/075,234, filed on Feb. 19, 1998.

(51) Int. Cl.
  *B01J 29/04* (2006.01)
  *B01J 29/80* (2006.01)

(52) U.S. Cl. .................. 502/61; 502/60; 502/64; 502/208

(58) Field of Classification Search .......... 502/208, 502/60, 61, 64
See application file for complete search history.

(56) References Cited

U.S. PATENT DOCUMENTS

| | | | |
|---|---|---|---|
| 3,493,490 A | 2/1970 | Plank et al. ................. 208/120 |
| 3,647,680 A | 3/1972 | Greenwood et al. .......... 208/65 |
| 3,652,231 A | 3/1972 | Greenwood et al. ...... 23/288 G |
| 3,692,496 A | 9/1972 | Greenwood et al. ...... 23/288 G |
| 4,043,938 A | 8/1977 | Reif et al. .................. 252/412 |
| 4,225,419 A | 9/1980 | Myers .......................... 208/135 |
| 4,417,975 A | 11/1983 | Myers et al. ............... 208/120 |
| 4,435,311 A | 3/1984 | Sikkenga ..................... 502/22 |
| 4,463,209 A | 7/1984 | Kursewicz et al. ......... 585/467 |
| 4,520,118 A | 5/1985 | Gane et al. ................... 502/53 |
| 4,600,700 A | 7/1986 | McHale ....................... 502/50 |
| 4,605,637 A | 8/1986 | Chang et al. ................ 502/64 |
| 4,629,716 A * | 12/1986 | Kemp ......................... 502/208 |
| 4,629,717 A | 12/1986 | Chao .......................... 502/208 |
| 4,705,909 A | 11/1987 | Yan ............................ 585/828 |
| 4,746,763 A | 5/1988 | Kocal ......................... 585/417 |
| 4,788,171 A * | 11/1988 | Klendworth ................ 502/155 |
| 4,810,687 A * | 3/1989 | Kemp ......................... 502/211 |
| 5,169,812 A | 12/1992 | Kocal et al. .................. 502/61 |
| 5,212,127 A | 5/1993 | Kocal et al. .................. 502/26 |
| 5,258,564 A | 11/1993 | Kocal et al. ................ 585/415 |
| 5,321,168 A | 6/1994 | Roussel et al. ............. 568/882 |
| 5,401,893 A | 3/1995 | Gosling et al. ............. 585/322 |
| 5,559,274 A | 9/1996 | Hammerman et al. ...... 568/803 |
| 5,569,791 A | 10/1996 | Hammerman et al. ...... 568/803 |
| 5,600,046 A | 2/1997 | Gosling et al. ............. 585/322 |
| 5,741,749 A | 4/1998 | Crocco et al. ................ 502/56 |
| 5,990,032 A | 11/1999 | Wu et al. ..................... 502/71 |
| 6,169,050 B1 | 1/2001 | Catinat et al. ................ 502/38 |

* cited by examiner

*Primary Examiner*—Elizabeth D. Wood
(74) *Attorney, Agent, or Firm*—James C. Paschall; Michael A. Moore (57) ABSTRACT

This invention relates to a process for reactivating a dehydrocyclodimerization catalyst. Dehydrocyclodimerization catalysts which contain an aluminum phosphate binder can be deactivated when they are exposed to hydrogen at temperatures above 500° C. The instant process restores substantially all of the catalyst's lost activity. The process involves treating the catalyst with a fluid comprising water and drying the catalyst. The process is employed particularly advantageously in combination with coke removal for reactivating catalysts that contain coke deposits and that have also been hydrogen deactivated. This invention also relates to a method of producing a dehydrocyclodimerization catalyst that is resistant to hydrogen deactivation.

19 Claims, 2 Drawing Sheets

METHOD FOR PREPARING DEHYDROCYCLODIMERIZATION CATALYST

CROSS-REFERENCE TO RELATED APPLICATION

This application is a continuation of U.S. application Ser. No. 10/113,689, filed Mar. 29, 2002 now U.S. Pat. No.6,657,096, the entire contents of which are hereby incorporated herein by reference, which is a division of U.S. application Ser. No. 09/244,725 filed Feb. 5, 1999, now U.S. Pat. No. 6,395,664 B1, the entire contents of which are hereby incorporated herein by reference, which claims the benefit of the provisional filing date of Application No. 60/075,234, filed Feb. 19, 1998.

FIELD OF THE INVENTION

The present invention relates to a process for reactivating a spent dehydrocyclodimerization catalyst, thereby extending the useful life of the catalyst.

BACKGROUND OF THE INVENTION

Dehydrocyclodimerization is a process in which aliphatic hydrocarbons containing from 2 to 6 carbon atoms per molecule are reacted over a catalyst to produce a high yield of aromatics and hydrogen, with a light ends byproduct and a $C_2$–$C_4$ recycle product. This process is well known and is described in detail in U.S. Pat. Nos. 4,654,455 and 4,746,763 which are incorporated by reference. Typically, the dehydrocyclodimerization reaction is carried out at temperatures in excess of 500° C. (932° F.), using dual functional catalysts containing acidic and dehydrogenation components. The acidic function is usually provided by a zeolite which promotes the oligomerization and aromatization reactions, while a non-noble metal component promotes the dehydrogenation function. One specific example of a catalyst disclosed in U.S. Pat. No. 4,746,763 consists of a ZSM-5 type zeolite, gallium and a phosphorus containing alumina as a binder.

The conditions used for the dehydrocyclodimerization reaction result in catalyst deactivation which is believed to be caused by excessive carbon formation (coking) on the catalyst surface. After several days (from about 3 to 10 depending on the operating temperature) enough activity has been lost due to coke deposition that regeneration of the catalyst is necessary. Regeneration involves burning or oxidizing the coke present on the catalyst at elevated temperatures. In addition to loss of activity due to coke formation, catalysts containing a phosphorus modified alumina as a binder are gradually deactivated (over a period of time from several months to about a year) by exposure to hydrogen at temperatures generally greater than 500° C. (932° F.) and particularly greater than 565° C. (1049° F.). This loss of activity due to hydrogen exposure cannot be restored by regeneration means, i.e., burning or oxidation at elevated temperatures. Therefore, a process is sought for reactivating catalysts that have lost activity due to exposure to hydrogen above 500° C. (932° F.).

As used in this application, regeneration refers to the process of restoring lost activity due to coke formation, while reactivation refers to the process of restoring lost activity due to hydrogen exposure.

U.S. Pat. No. 5,212,127 (Kocal et al.) describes a process for restoring substantially all of the activity of a dehydrocyclodimerization catalyst that has been deactivated by exposure to hydrogen at high temperature. This patent teaches treating the catalyst with an aqueous solution of a weakly acidic ammonium salt or a dilute acid solution, rinsing the treated catalyst, and oxidizing the rinsed catalyst to produce reactivated catalyst. The treating solution should contain from about 0.1 to about 5 moles/liter of the salt or acid, and the preferred trailing solution is an ammonium nitrate solution.

One of the problems with the reactivation process in U.S. Pat. No. 5,212,127 is the use of the salt or the acid in the treating solution. Expenses arise as a result of purchasing, handling and ultimately disposing of the salt or the acid. In addition, treating with the salt or the acid necessitates a rinsing step after treating and prior to oxidizing. Therefore, a process is sought for reactivating catalysts that have lost activity due to exposure to hydrogen above 500° C. (932° F.), wherein the process does not require a salt or acid in the treating solution. Preferably, the process should be easily incorporated and employed in commercial catalytic dehydrocyclodimerization processes.

SUMMARY OF THE INVENTION

This invention provides a reactivation process in which the catalyst is treated with a fluid comprising water at a temperature and for a time sufficient to restore at least part of the activity of the catalyst. Thus, this invention does not require an aqueous solution of a weakly acidic ammonium salt or a dilute acid solution in order to reactivate the catalyst. Fluid water, by which it is meant water that is in a non-solid phase such as liquid water or water vapor (steam), at least partially reactivates the catalyst. After the water treatment, the catalyst is dried, such as by oxidizing in air, at a temperature and for a time sufficient to at least partially reactivate the catalyst.

The discovery that liquid water, rather than a solution of water and salts or acids, can be the washing solution in a process for reactivating hydrogen-deactivated catalysts provides part of the basis for this invention. In addition, it has been discovered that water vapor (steam) can also be a reactivating agent in a process for reactivating hydrogen-deactivated catalyst. Although this invention is not limited to any particular explanation or theory for this discovery, it is believed that high temperature hydrogen deactivates the catalyst by removing hydroxyl groups, and that the fluid comprising water replenishes these hydroxyl groups, regardless of the presence of salts or acids. Another possible explanation for why fluid water reactivates the catalyst is that the water removes some deleterious species that have formed on the catalyst. Although the water may be removing aluminum and phosphorus, the water may also be removing some sodium, calcium, and silicon, as evidenced by analysis of the water after treating a hydrogen deactivated catalyst with liquid water.

In another surprising aspect of this invention, it has been observed that the range of temperature and pressure conditions under which the liquid water reactivates the catalyst is relatively wide, in contrast to a much narrower range of temperature and pressure conditions under which steam reactivates the catalyst. Furthermore, it has been discovered that steam can reactivate the catalyst, not only when pure steam is used but also when a mixture of steam and a diluent such as air is used. It has also been discovered that steam is more effective as a reactivating agent under steaming conditions when the steaming temperature is relatively low and the steam content is relatively high (i.e., little or no diluent.)

One theory that may explain why these steaming conditions are particularly and unexpectedly effective, as well as why liquid water is effective as a reactivating agent, is that the reactivation mechanism may involve wetting of the surfaces or pores of the catalyst with liquid water, and that such wetting is more likely to occur, even though water vapor (steam) is the reactivating agent, when the steaming conditions are closer to the point of saturation. Whatever the explanation, the conditions under which steam reactivates the catalyst are particularly advantageous because they allow this invention to be easily incorporated and employed in commercial catalytic dehydrocyclodimerization processes.

Accordingly, the instant invention relates to a process for reactivating a dehydrocyclodimerization catalyst that has been deactivated by exposure to hydrogen at a temperature above 500° C. (932° F.). The process comprises contacting the catalyst with fluid water to produce a treated catalyst and then drying the treated catalyst, thereby providing a reactivated catalyst. The concentration of an acidic ammonium salt or of an acid in the fluid water is less than about 0.1 mole/liter.

In another of its aspects, this invention also relates to a method of producing a catalyst that is resistant to deactivation by exposure to hydrogen at a temperature above 500° C. (932° F.). The method of producing the catalyst comprises a step in which the catalyst is treated with a dilute acid solution which has an acid concentration that is less than about 0.1 moles/liter. In the prior art, this treatment step required an acid concentration of at least 0.1 moles/liter.

INFORMATION DISCLOSURE

U.S. Pat. No. 5,212,127 (Kocal et al.) describes a process for reactivating a deactivated dehydrocyclodimerization catalyst by treating the catalyst with an aqueous solution of a weakly acidic ammonium salt or a dilute acid solution.

U.S. Pat. No. 4,605,637 (Chang et al.) describes increasing the cracking activity of a mixture of zeolite and an aluminum phosphate by contacting the mixture with an aqueous liquid phase.

U.S. Pat. No. 5,258,564 (Kocal et al.) discloses a process for converting $C_2$–$C_6$ aliphatic hydrocarbons to aromatics that uses a catalyst that is tolerant to exposure to hydrogen at a temperature of about 500° C. (932° F.) to 700° C.

U.S. Pat. No. 3,652,231 (Greenwood et al.) shows a regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with regeneration of reforming catalyst. The teachings of patents ('231, '680, and '496) are hereby incorporated in full into this patent application.

DETAILED DESCRIPTION OF THE INVENTION

As stated, this invention relates to a process for reactivating a deactivated dehydrocyclodimerization catalyst. The catalysts which require reactivation as described herein are those that contain a phosphorus modified alumina (hereinafter aluminum phosphate) as a binder in addition to a zeolite and a gallium component. As will be described in detail herein, these catalysts require reactivation because they have lost activity owing to exposure to hydrogen at temperatures generally above 500° C. (932° F.) and especially above 565° C. (1049° F.). These catalysts are well known in the art and their preparation is also well known as shown by U.S. Pat. No. 4,629,717 which is incorporated by reference.

The zeolites which may be used are any of those which have a molar ratio of silicon (Si) per aluminum (Al) of greater than about 10 and preferably greater than 20 and a pore diameter of about 5 to 6 Angstroms. Specific examples of zeolites which can be used are the ZSM family of zeolites. Included among this ZSM family are ZSM-5, ZSM-8, ZSM-11, ZSM-12 and ZSM-35. The preparation of these ZSM-type zeolites is well known in the art and generally are prepared by crystallizing a mixture containing an alumina source, a silica source, an alkali metal source, water and a tetraalkyl ammonium compound or its precursor. The amount of zeolite present in the catalyst can vary considerably but usually is present in an amount from about 30 to about 90 weight percent and preferably from about 50 to about 70 weight percent of the catalyst.

A second component of the catalyst is an aluminum phosphate. The phosphorus may be incorporated with the alumina in any acceptable manner known in the art. One method of preparing this aluminum phosphate is that described in U.S. Pat. No. 4,629,717. The technique described in the '717 patent involves the gellation of a hydrosol of alumina which contains a phosphorus compound using the well-known-oil drop method. Generally this technique involves preparing a hydrosol by digesting aluminum in aqueous hydrochloric acid at reflux temperatures of from about 80° C. (176° F. to about 105° C. (221° F.). The ratio of aluminum to chloride in the sol ranges from about 0.7:1 to about 1.5:1 weight ratio. A phosphorus compound is now added to the sol. Preferred phosphorus compounds are phosphoric acid, phosphorous acid and ammonium phosphate. The relative amount of aluminum and phosphorus expressed in molar ratios of aluminum per phosphorus ranges from about 1:1 to 1:100 on an elemental basis.

The resulting aluminum phosphate hydrosol mixture is now gelled. One method of gelling this mixture involves combining a gelling agent with the mixture and then dispersing the resultant combined mixture into an oil bath or tower which has been heated to elevated temperatures such that gellation occurs with the formation of spheroidal particles. The gelling agents which may be used in this process are hexamethylenetetraamine, urea or mixtures thereof. The gelling agents release ammonia at the elevated temperatures which sets or converts the hydrosol spheres into hydrogel spheres. The spheres are then continuously withdrawn from the oil bath and typically subjected to specific aging treatments in oil and in ammoniacal solution to further improve their physical characteristics. The resulting aged and gelled particles are then washed and dried at a relatively low temperature of from about 93° C. to about 260° C. (200 to 500° F.) and heated in air at a temperature of from about 450° C. to about 816° C. (850–1500° F.) for a period of about 0.5 to about 20 hours. The amount of phosphorus containing alumina component present (as the oxide) in the catalyst can range from about 10 to about 70 weight percent and preferably from about 30 to about 50 weight percent.

The zeolite and aluminum phosphate binder are mixed and formed into particles by means well known in the art such as gellation, pilling, nodulizing, marumerizing, spray drying, extrusion or any combination of these techniques. One method of preparing the zeolite/aluminum phosphate support involves adding the zeolite either to an alumina sol or a phosphorus compound, forming a mixture of the alumina sol/zeolite/phosphorus compound which is now formed into particles by employing the oil drop method described above. The particles are heated in air as described above to give a support. Another method of preparing the zeolite/aluminum phosphate support involves adding the zeolite to water, adding an alumina sol to the zeolite-water mixture, and adding a phosphorous compound and a gelling agent while bead milling the alumina sol/zeolite/water mixture to form a mixture of alumina sol/zeolite/phosphorous compound/gelling agent/water. As described above, the mixture is oil dropped to form particles, which are heated in air to give the support.

Another component of the catalysts which can be reactivated is a gallium component. The gallium component may be deposited onto the support in any suitable manner known to the art which results in a uniform dispersion of the gallium. Usually the gallium is deposited onto the support by impregnating the support with a salt of the gallium metal. The particles are impregnated with a gallium salt selected from the group consisting of gallium nitrate, gallium chloride, gallium bromide, gallium hydroxide, gallium acetate, etc. The amount of gallium which is deposited onto the support varies from about 0.1 to about 5 weight percent of the finished catalyst expressed as the metal.

The gallium compound may be impregnated onto the support particles by any technique well known in the art such as dipping the catalyst into a solution of the metal compound or spraying the solution onto the support. One preferred method of preparation involves the use of a steam jacketed rotary dryer. The support particles are immersed in the impregnating solution contained in the dryer and the support particles are tumbled therein by the rotating motion of the dryer. Evaporation of the solution in contact with the tumbling support is expedited by applying steam to the dryer jacket.

Next, the particles are heated in air and steam at a temperature of about 300° C. to about 800° C. (572° F. to 1472° F.) for a time of about 1 to about 10 hours. The amount of steam present in the air varies from about 1 to about 40 percent. Alternatively, the particles may be heated in air and steam in a two step process. In the first step, the particles are heated in air at a temperature of from about 316° C. to about 427° C. (600° F. to 800° F.) for a time of from about 0.5 to about 1 hr with no added steam, but with steam present in the air from about 10 to about 40 percent as a result of water vaporizing from the particles. In the second step, the particles are heated in air and steam at a temperature of from about 552° C. to about 663° C. (1025° F. to 1225° F.) for a time of about 1 to about 2 hr, with steam added in order to maintain about 5 to about 20 percent steam in the air. Either the one-step method or the two-step method provides a catalyst with well dispersed gallium.

It is preferred that the catalysts be treated with an aqueous solution of a weakly acidic ammonium salt or a dilute acid solution. The purpose of this treatment is to maximize both fresh catalyst activity and the resistance of the catalyst to deactivation caused by exposure to hydrogen. The ammonium salts which can be used include ammonium chloride, ammonium acetate, ammonium nitrate and mixtures thereof. The total concentration of these salts can vary from about 0.1 to about 5 molar. The acids which can be used include hydrochloric, acetic, nitric and sulfuric acid. Although concentrated acids could be used, they would degrade the zeolite and the integrity of the particles as well as removing the undesirable aluminum phosphorus species. It is desirable to use dilute acids which have a molarity of generally from about 0.001 to about 5 moles/liter and preferably from about 0.001 to about 1 moles/liter. Thus, in another aspect of this invention, it has been found that an increase in resistance to hydrogen deactivation in a catalyst can be achieved by using an acid treatment solution having a molarity lower than the minimum molarity of 0.1 moles/liter used in the prior art. Of these treatment solutions, it is preferred to use an ammonium nitrate solution. The treating solution is contacted with the catalyst particles that at a temperature of about 50° C. to about 100° C. (122° F. to 212° F.) for a time of about 1 to about 48 hours. After this treatment, the particles are separated from the aqueous solution, dried and heated in air at a temperature of about 500° C. to about 700° C. (932° F. to 1292° F.) for a time of about 1 to about 15 hours, thereby providing a catalyst that can be used in a dehydrocyclodimerization process that uses the instant invention.

The dehydrocyclodimerization conditions which are employed vary depending on such factors as feedstock composition and desired conversion. A desired range of conditions for the dehydrocyclodimerization of $C_2$–$C_6$ aliphatic hydrocarbons to aromatics include a temperature from about 350° C. to about 650° C. (662° F. to 1202° F.), a pressure from about 0 to about 300 psi(g) (0 to 2068 kPa(g)), and a liquid hourly space velocity from about 0.2 to about 5 $hr^{-1}$. The preferred process conditions are a temperature in the range from about 400° C. to about 600° C. (752° F. to 1112° F.), a pressure in or about the range from about 0 to about 150 psi(g) (0 to 1034 kPa(g)), and a liquid hourly space velocity of between 0.5 to 3.0 $hr^{-1}$. It is understood that, as the average carbon number of the feed increases, a temperature in the lower end of the temperature range is required for optimum performance and conversely, as the average carbon number of the feed decreases, the higher the required temperature.

The feed stream to the dehydrocyclodimerization process is defined herein as all streams introduced into the dehydrocyclodimerization reaction zone. Included in the feed stream is the $C_2$–$C_6$ aliphatic hydrocarbon. By $C_2$–$C_6$ aliphatic hydrocarbons is meant one or more open, straight or branched chain isomers having from two to six carbon atoms per molecule. Furthermore, the hydrocarbons in the feedstock may be saturated or unsaturated. Preferably, the hydrocarbons are $C_3$'s and/or $C_4$'s selected from isobutane, normal butane, isobutene, normal butene, propane and propylene. Diluents may also be included in the feed stream. Examples of such diluents include nitrogen, helium, argon, neon.

According to the present invention, the feed stream is contacted with the catalyst in a dehydrocyclodimerization reaction zone maintained at dehydrocyclodimerization conditions. This contacting may be accomplished by using the catalyst in a fixed bed system, a moving bed system, a fluidized bed system, or in a batch type operation; however, in view of the danger of attrition losses of the valuable catalyst and of the well-known operational advantages, it is preferred to use either a fixed bed system or a dense-phase moving bed system such as shown in U.S. Pat. No. 3,725,249.

In a fixed bed system or a dense-phase moving bed system, the feed stream is preheated by any suitable heating means to the desired reaction temperature and then passed into a dehydrocyclodimerization zone containing a bed of catalyst. It is, of course, understood that the dehydrocyclodimerization zone may be one or more separate reactors with suitable means between separate reactors if any to compensate for any endothermicity encountered in each reactor and to assure that the desired temperature is maintained at the entrance to each reactor. It is also important to note that the reactants may be contacted with the catalyst bed in either upward, downward, or radial flow fashion with the latter being preferred. In addition, the reactants are in the vapor phase when they contact the catalyst bed. Each reactor may contain one or more fixed or dense-phase moving beds of catalyst. The dehydrocyclodimerization system preferably comprises a dehydrocyclodimerization zone containing one or more reactors and/or beds of catalyst. In a multiple bed system, it is, of course, within the scope of the present invention to use one catalyst in less than all of the beds with another dehydrocyclodimerization or similarly behaving catalyst being used in the remainder of the beds. Specific to the dense-phase moving bed system, it is common practice to remove catalyst from the bottom of a reactor in the dehydrocyclodimerization zone, regenerate it by conventional means known to the art, and then return it to the top of that reactor or another reactor in the dehydrocyclodimerization zone.

After some time on stream (several days to a year), the catalyst described above will have lost enough activity due to hydrogen exposure so that it must be reactivated. It is believed that the exact amount of time which a catalyst can operate without necessitating reactivation will depend on a number of factors. One factor is whether during preparation the catalyst has been treated with an aqueous solution of an ammonium salt or a dilute acid, as described previously. See also U.S. Pat. No. 5,258,564. Other factors include the hydrogen partial pressure and the temperature to which the catalyst is exposed.

When the catalyst requires reactivation, it is removed from the operating reactor and contacted with fluid water. The fluid water can comprise liquid water and/or steam. The fluid water has a concentration of an ammonium salt or an acid that is less than 0.1 moles per liter, and preferably less than 0.01 moles per liter. The term "ammonium salt" includes ammonium chloride, ammonium acetate, ammonium nitrate and mixtures thereof. The term "acid" as used herein in the context of treating catalyst that has been deactivated because of exposure to hydrogen above 500° C. (932° F.) includes hydrochloric, acetic, nitric, and sulfuric acids.

It is believed that the source of the fluid water is not critical to the access of this invention, provided that the concentration of an ammonium salt or of an acid is less than 0.1 moles per liter. Accordingly, reagent grade water is believed to be suitable for the fluid water. An example of reagent grade water is American Chemical Society CAS Number 7732-18-5, which is available from Aldrich, Milwaukee, Wis., USA. Suitable fluid water is not limited to reagent grade water, however. The source of the fluid water may be water that has a concentration of a ammonium salt or of an acid that is greater than 0.1 moles per liter and that has been processed to decrease the concentration to less than 0.1 moles per liter. Such processing includes distillation optionally followed by condensation, and also includes deionization. By deionization it is meant the removal by ion exchange from the water of at least a portion of its cations such as sodium, magnesium, and calcium, or of its anions such sulfates, carbonates, and nitrates. Ions may deposit on the catalyst and cause deleterious affects on the performance of the catalyst. Preferably, the water has also been processed to remove solids, such as by filtration or by reverse osmosis. Solids may deposit on the catalyst and adversely affect catalytic performance also.

Generally, when liquid water is used, the liquid water contacts the catalyst at a temperature of generally greater than about 32° F. (0° C.), and preferably from about 32° F. (0° C.) to about 300° F. (149° C.) for a time of from about 0.0001 to about 48 hours, and preferably from about 0.0001 to about 5 hours. The pressure can be any pressure that is sufficient to maintain the water in a liquid phase.

When steam is used, the steam contacts the catalyst at a temperature of generally from about 212° F. (100° C.) to about 1100° F. (593° C.) and preferably from about 250° F. (121° C.) to about 450° F. (232° C.). The steam contacts the catalyst usually at a pressure of from about atmospheric pressure to about 75 psi(g) (517 kPa(g)), but it is believed that pressure is not a critical variable and therefore pressures above 75 psi(g) (517 kPa(g)) may also be used. Although it is believed that the contact time may be as short as 0.0001 hours, the contact time is usually from about 0.001 to about 5 hours, preferably from about 1 to about 2 hours, and more preferably about 1 hour. The stream that contacts the catalyst is preferably 100% steam, but more generally may have a steam content of from about 30% to about 100%. The non-steam balance of the stream may be a diluent such as oxygen, nitrogen, or air. The gas hourly space velocity (GHSV) of the stream that contacts the catalyst, including steam and any diluent, is generally from about 20 to about 20000 hr$^{-1}$, preferably from about 50 to about 1000 hr$^{-1}$, and more preferably from about 200 to about 400 hr$^{-1}$.

As an alternative to being contacted with liquid water or steam, the catalyst may also be contacted with a mixture of liquid water and steam.

After the catalyst has been contacted with fluid water, at least a portion of the water is removed from the catalyst. After the water is removed, the volatiles content of the catalyst as determined by loss on ignition at 900° C. (1652° F.), which is hereinafter referred to as LOI. The LOI of the catalyst is generally less than 5 wt-% and preferably less than 3 wt-%, although it is believed that the precise LOI is not critical to the success of this invention. It is believed that in general the lower the LOI of the catalyst that is used for dehydrocyclodimerization, the better will be the performance of the catalyst for dehydrocyclodimerization. Generally, in order to effect drying, the catalyst is heated in the presence of a gas, but the particulars of the method of heating and of the gas are believed to be not critical to the success of this invention, provided that at least a portion of the water is removed from the catalyst. The water removal may be effected in a single stage or in multiple stages, at one temperature or at several temperatures, and with a single gas or with a number of gases. Preferably, the gas or gases do not at the temperatures employed to remove the water have a detrimental effect on the performance of the catalyst.

One method of removing water from the catalyst employs three stages. In the first stage, the catalyst is heated in the presence of air, oxygen, or nitrogen to a temperature of from about 200° F. (93° C.) to about 1200° F. (649° C.) and preferably from about 200° F. (93° C.) to about 1000° F. (538° C.). The time for this first stage is usually from about 0.1 to about 5 hours, preferably about 2 hours, and more preferably 1 hour. The gas hourly space velocity (GHSV) is generally from about 20 to about 20000 hr$^{-1}$, preferably from about 200 to about 1000 hr$^{-1}$, and more preferably from about 200 to about 450 hr$^{-1}$. The pressure is usually from about atmospheric pressure to about 75 psi(g) (517 kPa(g)). Pressures above 75 psi(g) (517 kPa(g)) may also be used, but it is expected that, with all other conditions the same, as the pressure increases the rate of drying decreases and, therefore, in order to maintain a desired drying rate a higher drying temperature may be needed. In addition to water removal, some oxidation of the catalyst metal (e.g., gallium) may occur at the conditions of the first stage.

In the second stage, additional water removal can occur without any oxidation of the catalyst metal, although oxidation of the metal is more likely to occur. Accordingly, after the first stage, the catalyst may be heated in air or oxygen at a temperature of from about 900° F. (482° C.) to about 1300° F. (704° C.) for a time of from about 1 to about 15 hours, and preferably from about 2 to about 5 hours. The pressure during this second stage is typically from about atmospheric pressure to about 75 psi(g) (517 kPa(g)), but pressures above 75 psi(g) (517 kPa(g)) may also be used. Although during this second stage steam may be introduced so that the catalyst is heated in the presence of an air-steam or oxygen-steam mixture that contains up to 20% steam, the catalyst is heated in air that contains preferably less than 10% steam, and more preferably less than 0.1% steam. The general and preferred ranges of residence times and GHSV for the second stage are the same as those given above for the first stage.

After the first two stages, even more water can be removed from the catalyst in a third stage prior to using the catalyst in the dehydrocyclodimerization process described above. Accordingly, prior to being contacted with the dehydrocyclodimerization feedstock (e.g., $C_{2-C6}$ aliphatic hydrocarbons), the catalyst may be contacted with a hydrogen-containing or nitrogen-containing gas at conditions sufficient to remove still more water from the catalyst. If a hydrogen-containing gas is employed, then the conditions in the third stage may also be sufficient to reduce the catalyst metal (e.g., gallium), but reduction of the catalyst metal is not a requirement of either the third stage or of this invention. The hydrogen-containing gas typically is hydrogen-rich, which means the gas has a hydrogen concentration of at least 50 mol-%. Although the third stage conditions are sufficient to remove water and possibly to reduce the catalyst metal, they are generally not sufficient for any significant hydrogen deactivation to occur, even if the gas that contacts the catalyst is hydrogen-rich. By significant hydrogen deactivation, it is meant a decrease in conversion of propane in the dehydrocyclodimerization feedstock of 3% or more. The third stage conditions include a temperature of generally from about 200° F. (93° C.) to about 1050° F. (566° C.) and preferably from about 300° F. (149° C.) to about 1000° F. (538° C.) and a pressure of generally from about 0 to about 300 psi(g) (0 to 2068 kPa(g)) and usually within about 10 psi (69 kPa) of the pressure of the dehydrocyclodimerization conditions. The gas hourly space velocity (GHSV) of the gas stream that contacts the catalyst is generally from about 20 to about 20000 hr$^{-1}$, preferably from about 50 to about 1000 hr$^{-1}$, and more preferably from about 200 to about 500 hr$^{-1}$. The residence time of catalyst in the third stage is generally from about 0.01 to about 5 hr and preferably from about 0.5 to about 2 hr.

A preferred method of removing water from the catalyst employs two stages, with each stage comprising a moving catalyst bed. The first stage of the two-stage method operates generally at the conditions of the first stage of the previously described three-stage method. The gas and the catalyst flow countercurrently, with the inlet temperature of the catalyst ranging from about 250° F. (121° C.) to about 300° F. (149° C.), the outlet temperature of the catalyst ranging from about 200° F. (93° C.) to about 250° F. (121° C.), and the inlet temperature of the gas ranging from about 200° F. (93° C.) to about 250° F. (121° C.). The second stage of the two-stage method operates generally at the conditions of the third stage of the previously described three-stage method. In the second stage of the two-stage method, the catalyst passes through an entrance portion of the second stage which operates at a catalyst temperature ranging from about 300° F. (149° C.) to about 600° F. (316° C.), and then through an exit portion of the second stage which operates at a catalyst ranging from about 300° F. (149° C.) to about 1000° F. (538° C.) and preferably from about 600° F. (316° C.) to about 1000° F. (538° C.). The catalyst and a portion of the gas flow cocurrently in the entrance portion, and the catalyst and another portion of the gas flow countercurrently in the exit portion. The catalyst residence times and gas flows are approximately equal in both portions of the second stage. The outlet gases of each portion are separately withdrawn from the second stage.

Using this invention, the catalyst can be reactivated multiple times using this procedure. Thus, the catalyst can be hydrogen deactivated, then reactivated according to the method of this invention, then hydrogen deactivated again, then reactivated again according to the method of this invention, and so forth. No limit on the number of times that a particular catalyst can be deactivated and subsequently reactivated according to the method of this invention is known.

Figure 1:
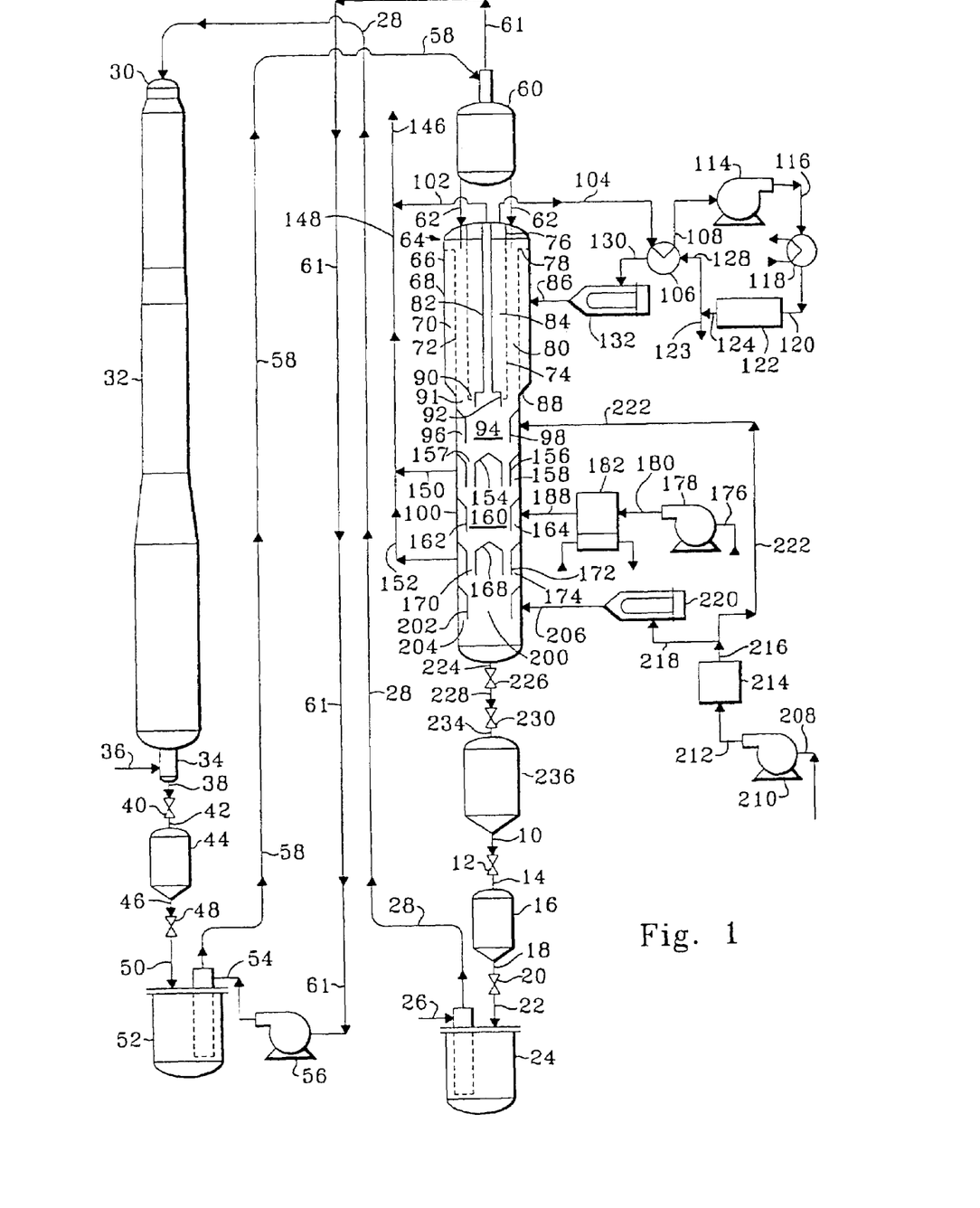
FIG. 1 shows a flow diagram of an embodiment of the invention.
Figure 2:
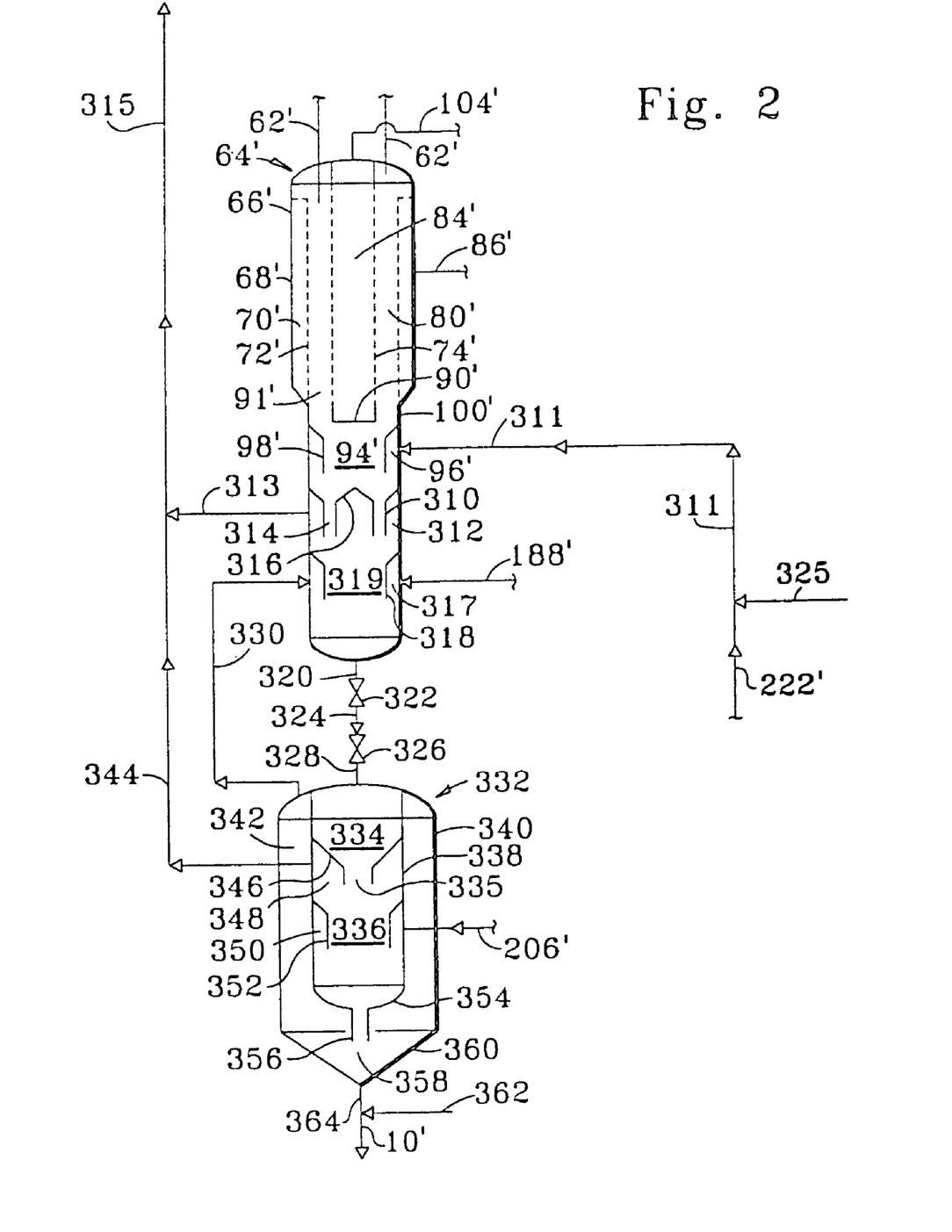
FIG. 2 shows a flow diagram of an embodiment of the invention that is a variation of the embodiment shown in FIG. 1.

FIGS. 1 and 2 will now be used in describing two specific embodiments of the invention. These two embodiments are not intended to limit the broad scope of the invention as presented in the claims. The Figures show only elements and equipment which are essential to a clear understanding of the invention. The application and use of additional required items are well within the purview of a person of ordinary skill in the art. U.S. Pat. Nos. 3,652,231; 3,647,680; and 3,692,496; which are incorporated by reference into this document, may be consulted for additional detailed information.

FIG. 1 illustrates a reactor and regenerator system for a dehydrocyclodimerization reaction zone that uses this invention to reactivate a deactivated dehydrocyclodimerization catalyst with steam. Starting first with the movement of partially regenerated catalyst, catalyst particles are withdrawn from a regeneration vessel 64 at regular intervals by way of conduits 224, 228, and 234 through control valves 226 and 230, and are collected in a surge hopper 236. The surge hopper 236 provides a surge capacity of partially regenerated catalyst between the regeneration vessel 64 and a stacked reactor arrangement 32 of dehydrocyclodimerization reactors. The catalyst particles are subsequently transferred at regular intervals from the surge hopper 236 by way of conduits 10 and 14 through a control valve 12 and are collected in a lock hopper 16. The catalyst particles are then transferred to a lift engager 24 via conduits 18 and 22 through a control valve 20 to be conveyed to the stacked reactor arrangement 32. A lift stream preferably comprising hydrogen is introduced to the lift engager 24 through a conduit 26 at a rate so that the lift stream transports the catalyst particles upwardly from the lift engager 24 through a lift conduit 28 to the top 30 of the stacked reactor arrangement 32, which the catalyst particles and the lift stream enter. FIG. 1 shows the stacked reactor arrangement 32 comprising three reactors in a single stack. This invention can also use other stacked reactor arrangements, such as four reactors in a single stack, two stacks with two reactors in each stack, and two reactors in a single stack and a separate third reactor.

Catalyst particles flow from the top to the bottom of the stacked reactor arrangement 32, passing first through a final drying zone prior to being used to catalyze dehydrocyclodimerization reactions. In the final drying zone, a hydrogen-rich gas contacts and removes water from the catalyst particles. Some reduction of the catalyst metal (e.g., gallium) may occur in the final drying zone. The final drying zone may comprise one or more drying stages in which the hydrogen-rich gas may contact the catalyst in a direction that is cocurrent or countercurrent to the catalyst flow, or in a combination of these directions, or in a direction intermediate between these directions. From the final drying zone, the catalyst particles pass through the multiple stages of reaction in which process fluids contact the catalyst particles. Details of the contacting beds and other internals of the stacked reactor arrangement 32 are well known to those skilled in the art and permit continuous or intermittent flow of the catalyst particles from the top 30 of the stacked reactor arrangement 32 to a lower retention chamber 34 at the bottom of the stacked reactor arrangement 32. A purging fluid preferably comprising hydrogen enters the lower retention chamber 34 through a conduit 36 at a rate that purges hydrocarbons from the catalyst particles in the lower retention chamber 34.

Spent catalyst particles are withdrawn intermittently through a conduit 38 and by means of a control valve 40 in order to effect a moving bed type of operation in the stacked reactor arrangement 32, the catalyst being discharged through a conduit 42 into a lock hopper 44 for separation of residual hydrocarbon from the catalyst particles. The spent catalyst particles are subsequently transferred through conduits 46 and 50 and control valve 48 to a lift engager 52 to be lifted in a nitrogen stream to a disengaging hopper 60 by way of a lift conduit 58. The catalyst particles are lifted to the disengaging hopper 60 by a flow of a gaseous lift medium charged to lift engager 52 by a blower 56 through a conduit 54. The description that follows is based on the use of nitrogen as the gaseous lift medium, but other gases such as carbon dioxide may be used. Nitrogen to the blower 56 is charged from a conduit 61 which recycles nitrogen from the disengaging hopper 60 to the blower 56. Means for removing broken or chipped catalyst particles and catalyst fines may be provided with or in the disengaging hopper 60, or between the disengaging hopper 60 and the blower 56 along the route of the conduit 61, but such means are well known to persons of ordinary skill in the art of gas-solids separation and are not, therefore, shown in FIG. 1.

The catalyst particles flow downwardly through the disengaging hopper 60 and enter a regeneration vessel 64 by means of inlet conduits 62. The regeneration vessel 64 has an upper section 66 and a lower section 100 and is cylindrical in form. Looking first at the flow of catalyst particles through the regeneration tower 64, inlet conduits 62 discharge catalyst particles into an annular catalyst bed 80 formed by an outer catalyst particle retention screen 72 and an inner catalyst particle retention screen 74. The volume of catalyst particles in the upper section 66 is located in a combustion zone that is generally denoted as 68. Retention screens 72 and 74 are cylindrical in form and concentric with the regeneration vessel 64. Retention screens 72 and 74 have openings that are large enough to allow gas to pass through the annular catalyst bed 80 but not permit the passage of catalyst particles therethrough. Outer retention screen 72 extends downward from the bottom of inlet conduits 62 to a swedge section 88 of the regeneration vessel 64. Supports 78 guide the top of outer retention screen 72 and keep it centered in the regeneration vessel 64. Inner retention screen 74 is attached to the top head of the regeneration vessel 64 and extends downward therefrom to a point slightly below the lower end of the outer retention screen 72 and slightly above the lower end of an end closure or enlarged end 92 of a cooling vent conduit 82. The enlarged end 92 is cylindrical in form and is concentric with the regeneration vessel 64. The bottom of inner retention screen 74 is open and the enlarged end 92 is perforated with holes to allow oxygen-containing gas to flow upward from a cooling bed 94 to a central section 84, as will be described hereinafter. The bottom 91 of the annular catalyst bed 80 is open to allow catalyst particles to empty from the catalyst bed 80 into the cooling bed 94. Between the outer edges of the enlarged end 92 and the inner retention screen 72 is an opening 90 which then allows oxygen containing gas to flow upward as will be described hereinafter.

From around the open bottom 91 of annular bed 80, the catalyst particles fill the catalyst beds in the lower section 100 of the regeneration vessel 64. Most of the volume of catalyst particles in the lower section 100 is located in three catalyst beds: the cooling bed 94, a steaming bed 160, and a drying bed 200. Cooling of the catalyst particles occurs in the cooling bed 94. Cooling bed 94 is formed by the annular baffle 98, which comprises an upper frusto-conical section and a lower vertical cylindrical section and which is concentric with the centerline of the regeneration vessel 64. The lower portion of the bed 94 is open to allow catalyst particles to empty from the catalyst bed 94 into a cylindrical bed 160, called the steaming bed. In this embodiment, the catalyst particles reach cylindrical bed 160 from cylindrical bed 94 by passing through an annular bed 157 formed between an annular baffle 156 and a central baffle 154. Annular baffle 156 comprises an upper frusto-conical section and a lower vertical cylindrical section, and annular baffle 156 is concentric with the center line of the regeneration vessel 64. Central baffle 154 comprises an upper conical section and a lower cylindrical section, and central baffle 154 is concentric with the center line of the regeneration vessel 64. An annular space 158 is formed between the annular baffle 156 and the wall of the regeneration vessel 64. Horizontal conduits (not shown) provide communication for gas between the annular space 158 and the space that is above the catalyst bed 160 and beneath the central baffle 154. These horizontal conduits do not significantly interfere with the flow of catalyst through the annular opening 157.

Steaming of the catalyst particles occurs in the steaming bed 160. The structural design of the steaming bed 160 is in many respects the same as that of the cooling bed 94. The upper portion of the bed 160 is formed by the wall of the regeneration vessel 64, and the lower portion of the bed 160 is formed by an annular baffle 162 that comprises an upper frusto-conical section and a lower vertical cylindrical section. The lower portion of the bed 160 is open to allow catalyst particles to empty from the catalyst bed 160 into a cylindrical bed 200, called the drying bed. In this embodiment, the catalyst particles reach cylindrical bed 200 from cylindrical bed 160 by passing through an annular bed 170 formed between an annular baffle 172 and a central baffle 168. The structure that forms annular bed 170 is similar to that which forms annular bed 157. Also, as in the case of annular bed 157, horizontal conduits (not shown) allow gas to communicate between an annular space 174, which is formed in part by the annular baffle 172, and the space that is above the catalyst bed 200 and beneath the central baffle 168.

Drying of the catalyst particles occurs in the drying bed 200. The structural design of the drying bed 200 is the same in many respects as that of the previously described beds 94 and 160. The upper portion of the drying bed 200 is formed by the wall of the regeneration vessel 64, and the lower portion of the drying bed 200 is formed by an annular baffle 202 that comprises an upper frusto-conical section and a lower vertical cylindrical section. The lower portion of the drying bed 200 is open to allow catalyst particles to empty from the catalyst bed 200 and into the outlet conduit 224. The catalyst particles in the drying bed 200 are statically supported by catalyst particles that extend through the outlet conduit 224.

The catalyst particles are periodically transferred by withdrawing a predetermined volume of catalyst from the drying bed 200 through the outlet conduit 224 by means of opening and closing the control valves 226 and 230, which in turn allows all the catalyst particles to slump downward through the previously described zones. Catalyst is withdrawn from the outlet conduit 224 at a rate that creates a 1 to 5 hour residence time for a catalyst particle in the cooling bed 94 to pass from the top of the cylindrical section of the annular baffle 98 to the bottom of the cylindrical section of annular baffle 98, a 1 to 5 hour residence time for a catalyst particle in the steaming bed 160 to pass from the top to the bottom of the cylindrical section of the annular baffle 162, and a 1 to 5 hour residence time for a catalyst particle in the drying bed 200 to pass from the top to the bottom of the cylindrical section of the annular baffle 202.

Looking next to the flow of gas streams to and from the upper section 66 of the regeneration tower 64, a stream of oxygen-containing recycle gas/flue gas leaves through a conduit 104. The recycle gas/flue gas enters a heat exchanger 106, which cools the recycle gas/flue gas stream by transferring heat to a recycle gas stream flowing through a conduit 128. As will be described hereinafter, the recycle gas stream is a portion of the recycle gas/flue gas stream that is recycled to the regeneration vessel 64. After cooling in the heat exchanger 106, the recycle gas/flue gas stream passes through a conduit 108 and to a compressor 114. From the discharge of the compressor 114, the recycle gas/flue gas stream flows through a conduit 116 and enters a cooler 118. The cooler 118 removes some heat from the recycle gas/flue gas stream during normal operation in order to maintain a desired temperature at the inlet of an adsorber bed 122. The cooler 118 operates in conjunction with a heater 132 to regulate the heat content of the recycle gas.

The recycle gas/flue gas stream exits the cooler 118 through a conduit 120 and passes through the adsorber bed 122 which removes water from the recycle gas/flue gas. Suitable adsorbents for adsorber bed 122 could include zeolites A, X, and Y, as well as activated alumina. The recycle gas/flue gas stream that exits the adsorber bed 122 has a moisture content of generally less than about 10 vol-ppm water, preferably less than about 1.0 vol-ppm water, and more preferably nil vol-ppm water. The recycle gas/flue gas stream passes through a conduit 124. A slip stream of the recycle gas/flue gas stream in the conduit 124 flows through a conduit 123 and can be routed to facilities (not shown) for venting, for scrubbing and subsequent venting, or for regenerating water-laden adsorbent from bed 122 for re-use in bed 122 followed by venting. The volumetric flow rate of the portion of the slip stream that is vented from the process is approximately equal to the volumetric flow rate of the hereinafter-described oxygen-containing gas that flows upward from the cooling bed 94 to the central section 84. Most of the recycle gas/flue gas stream in the conduit 124 flows through the conduit 128, at which point this portion of the recycle gas/flue gas is referred to as the recycle gas. The recycle gas flows then flows through the heat exchanger 106, thereby heating the recycle gas. The recycle gas exits the heat exchanger 106 through a conduit 130 and passes through an electric heater 132 which further heats the recycle gas stream to the desired inlet temperature of the combustion zone 68.

The recycle gas exits the electric heater 132, passes through a line 86, and enters the regeneration vessel 64. The recycle gas enters the annular space 70 between the outer surface of the outer catalyst particle retention screen 72 and the wall of the regeneration vessel 64. Within this annular space 70, the recycle gas distributes itself along the length and around the circumference of the outer surface of the outer catalyst particle retention screen 72. The recycle gas flows radially inward through the outer retention screen 72 and into the annular catalyst bed 80, where oxygen in the recycle gas combusts coke on the catalyst particles. A flue gas stream containing the by-products of coke combustion such as carbon dioxide and water is produced in the annular catalyst bed 80, and flows from the annular catalyst bed 80 radially inward and through the inner catalyst particle retention screen 74. As the flue gas stream exits from the inner retention screen 74, the flue gas mixes in a space 84 with oxygen-containing gas flowing upward from the cooling bed 94. The upwardly flowing gas from the cooling bed 94 passes through perforated holes in the top portion of the enlarged end 92 and also through the opening 90, and enters the space 84. Space 84 is formed in part by the inner surface of the inner catalyst particle retention screen 74 and the outer surface of the cooling vent conduit 82. A mixture of the flue gas and the oxygen-containing gas forms the oxygen-containing recycle gas/flue gas stream that flows upwardly through the space 84 and is recovered from the regeneration tower 64 through the conduit 104.

Looking next to the cooling bed 94, air from the atmosphere is drawn through a conduit 208 by a blower 210. Blower 210 compresses and discharges the air through a conduit 212. The compressed air is dried in a dryer 214. The compressed and dried air stream flows through a conduit 216, and splits into two portions. A first portion of the compressed and dried air stream flows through a conduit 222 and enters an annular chamber 96 formed in part by the annular baffle 98 and the wall of the regeneration vessel 64. The compressed and dried air stream is distributed downwardly through the annular chamber 96, reverses direction, and flows nearly uniformly upwardly in a counterflow manner through the cooling bed 94. In the cooling bed 94, the air contacts the hot catalyst particles which have descended into the cooling bed 94 from the annular bed 80. The air stream enters the bottom of the cooling bed 94 generally at a temperature of between about 50 to about 100° F. (10 to 38° C.) or cooler. Within the cooling bed 94, the ratio of the thermal flow rate of the air to the thermal flow rate of the catalyst particles is less than 0.9 or greater than 1.15, and preferably it is less than 0.85 and greater than 1.20.

The oxygen-containing gas, which is mostly air and which reaches the top of the cooling bed 94, can split into several portions, depending on the amount of coke that is being burned in the combustion zone 68. Usually one portion flows through the opening 90 and into the space 84.

This first portion of the gas that exits the cooling bed 94 normally supplies oxygen for burning coke in the combustion zone 68. Usually a second portion of the oxygen-containing gas exiting from the top of the cooling bed 94 flows inside the enlarged end 92 and flows through the perforated holes in the enlarged end 92 and into the space 84. Like the first portion of the oxygen-containing gas, this second portion of the oxygen-containing gas also normally supplies oxygen for the combustion zone 68. Normally, there is no flow through the cooling vent conduit 82. If, however, the quantity of oxygen in the gas that reaches the top of the cooling bed 94 exceeds the requirements for burning coke in the combustion zone 68, then at least some of the oxygen-containing gas that reaches the top of the cooling bed 94 flows through the cooling vent conduit 82. The gas flowing through the cooling vent conduit 82, if any, exits the regeneration tower 64 through a conduit 102 and is rejected from the process through a conduit 146. The gas flow rate in conduit 102 is controlled by a control valve (not shown) in conduit 102 which is regulated by a pressure instrument (also not shown) which measures the pressure in the conduit 86. In general, the greater the flow rate of gas through the cooling vent conduit 82, the less is the flow rate of gas through the opening 90 and through the perforated holes in the top portion of the enlarged end 92.

Looking next to the flow of gases to and from the steaming bed 160, an important aspect of this embodiment of the present invention is that a controlled flow rate of steam can be allowed to enter the steaming bed 160 through a conduit 188 in order to reactivate the catalyst particles in the steaming bed 160. The source of steam is the plant supply of steam condensate or demineralized water, which is subsequently vaporized to produce steam. Steam produced in this manner is usually more pure than plant supplies of steam. Accordingly, condensate is supplied to the process through a conduit 176 to an injection pump 178, which discharges the condensate through a conduit 180 to a condensate vaporizer 182. The condensate vaporizer 182 can be any sort of heat exchanger known to persons of ordinary skill in the art that is capable of vaporizing condensate into steam. Preferably, the vaporizer 182 is an indirect shell and tube heat exchanger, with bayonet-type heat transfer tubes (not shown) and the heating medium for the vaporizer 182 is preferably steam at a temperature greater than the desired temperature of the steam produced in the vaporizer 182. The steam produced by the vaporizer 182 discharges through a conduit 188 into the regeneration vessel 64. The pressure in the vaporizer 182, and hence the temperature of the steam exiting the vaporizer 182, is controlled by a control valve (not shown) in the conduit 188.

The steam in conduit 188 enters into an annular space 164 formed between the wall of the regeneration tower 64 and the annular baffle 162. The steam is distributed downwardly through the annular space 164, reverses direction, and flows nearly uniformly upwardly in a counterflow manner through the steaming bed 160. Although the stream entering the steaming bed 160 through the conduit 188 is preferably 100% steam as just described, the steaming bed 160 may be contacted with a gas having a steam content of from 50 to 100%. Accordingly, although not shown in FIG. 1, a conduit carrying a diluent such as oxygen, nitrogen, carbon dioxide, or air, may connect with the conduit 188 so that the diluent stream combines with the steam stream from the vaporizer 182, thereby forming a diluted steam stream having a steam content of less than 100% that flows to the steaming bed 160. The residence time for a catalyst particle in the steaming bed 160 is generally from about 1 to about 5 hours, and preferably from about 1 to 2 hours. Because the steaming bed 160 is open with respect to the rest of the regeneration tower 64 as to the flows of gas and catalyst, the steaming bed 160 conveniently operates within 0.2 to 1.0 psi (1.4 to 6.9 kPa) of the pressures of the combustion zone 68, the cooling bed 94, and the drying bed 200. The gas hourly space velocity (GHSV) of the steam in the steaming bed 160 is generally about 400 hr$^{-1}$.

The temperature of the steam or steam-diluent mixture which contacts the catalyst particles in the steaming bed 160 is generally from about 200 to 500° F. (93 to 260° C.), and preferably from about 250 to about 450° F. (121 to 232° C.). The temperature of the catalyst in the steaming bed 160 is generally from about 200 to about 500° F. (93 to 260° C.) and preferably from about 250 to about 450° F. (121 to 232° C.). The relative flow rates of catalyst particles and steam or steam-diluent mixture in the steaming bed 160 are such that over the length of the steaming bed 160 the heat transfer between the catalyst particles and the steam or steam-diluent results in the temperature of the steam or steam-diluent being usually within about 50° F. (28° C.), preferably within about 10° F. (6° C.), and more preferably within about 1–5° F. (1–3° C.) of the temperature of the catalyst particles in the steaming bed 160. Thus, for example, if the catalyst particles enter the top of the steaming bed 160 at a temperature of 460° F. (238° C.) and exit the bottom of the steaming bed 160 at a temperature of 230° F. (110° C.), the temperature of the steam or steam-diluent mixture enters the bottom of the steaming bed 160 at a temperature of usually within about 50° F. (28° C.) of 230° F. (110° C.) and exits the top of the steaming bed 160 at a temperature of usually within about 50° F. (28° C.) of 460° F. (238° C.). In general, the difference in temperature between the entering steam and the exiting catalyst particles depends on the superficial velocity of the steam through the steaming bed 160.

The steam or steam-diluent mixture that reaches the top of the steaming bed 160 exits through an annular chamber 158 formed between the annular baffle 156 and the wall of the regeneration vessel 64. From the annular chamber 158, the steam exits the regeneration vessel 64 through a conduit 150, a conduit 148, and the conduit 146. From the previous description, catalyst particles reach cylindrical bed 160 from cylindrical bed 94 by passing through an annular bed 157, and in theory some of the steam or steam-diluent mixture that reaches the top of the steaming bed 160 could flow through the annular bed 157 and into the cylindrical cooling bed 94. However, the net gas flow through the annular bed 157 is downward not upward. The net downward flow is controlled by a control valve (not shown) in the conduit 150 that is regulated by a differential pressure instrument (not shown) that measures the differential pressure between the annular chamber 96 and the annular chamber 158. So the steam or steam-diluent mixture that reaches the top of the steaming bed 160 exits through the conduit 150.

Looking next to the flow of gases to and from the drying bed 200, the second portion of the dried and compressed air stream that flows through the conduit 216 passes through a conduit 218, is heated in an electric heater 220, and passes through a conduit 206. This heated air enters the regeneration vessel 64 into an annular chamber 204 which is formed between the wall of the regeneration vessel 64 and the annular baffle 202. The heated air stream is distributed downwardly through the annular chamber 204, reverses direction, and flows nearly uniformly upwardly in a counterflow manner through the drying bed 200. Typically, about half of the water contained on the catalyst particles that enter the drying bed 200 is removed as a result of being contacted with the heated air stream. Most of the water that remains on the catalyst particles leaving the drying bed 200 is removed in the final drying zone at the top 30 of the stacked reactor arrangement 32. The drying in the final drying zone occurs as a result of the catalyst particles being contacted with the hydrogen-rich gas, as described previously.

The gas that reaches the top of the drying bed 200 contains air and water removed from the catalyst particles in the drying bed. The gas passes through an annular chamber 174 and exits the regeneration vessel 64 through conduits 152, 148, and 146. As described previously, catalyst particles reach drying cylindrical bed 200 from steaming bed 160 by passing through an annular bed 170. However, the net gas flow through the annular bed 170 is upward and is controlled by a control valve (not shown) in the conduit 152 that is regulated by a differential pressure instrument (not shown) that measures the difference in pressure between the annular chambers 174 and 164. Thus, the gas that reaches the top of the drying bed 200 exits through the conduit 152.

FIG. 2 illustrates an embodiment of the invention where the cooling bed and the steaming bed are located in the regeneration vessel, and the drying bed is located in the surge hopper, which is a vessel separate from and downstream from the regeneration vessel. This is in contrast to FIG. 1 where the cooling bed, the steaming bed, and the drying bed are all located in the regeneration vessel. Despite this difference, the process depicted in FIG. 2 is very similar to the process depicted in FIG. 1, and consequently, parts of FIG. 1 correspond directly to parts of FIG. 2. Corresponding parts in FIGS. 1 and 2 have been given the same reference numbers.

Referring now to FIG. 2, inner catalyst particle retention screen 74', which is attached to the top head of the regeneration vessel 64', extends downward therefrom to a point slightly below the lower end of the outer catalyst particle retention screen 72', and the lower portion of the cooling bed 94' is open to allow catalyst particles to empty from the catalyst bed 94' into a cylindrical bed 319, called the steaming bed.

The catalyst particles reach steaming bed 319 from cooling bed 94' by passing through an annular bed 314 formed between an annular baffle 310 and a central baffle 316. Horizontal conduits (not shown) provide gas communication between an annular space 312 and the space that is above the catalyst bed 319 and beneath the central baffle 316. The upper portion of the bed 319 is formed by the wall of the regeneration vessel 64', and the lower portion of the bed 319 is formed by an annular baffle 318. The lower portion of the bed 319 is open to allow catalyst particles to empty from the catalyst bed 319 and into an outlet conduit 320, through which the catalyst particles leave the regeneration tower 64'. The catalyst particles in the bed 319 are statically supported by catalyst particles that extend through the outlet conduit 320 from the bottom of the regeneration vessel 64'. Catalyst particles are withdrawn from the regeneration vessel 64' at regular intervals by way of conduits 320, 324, and 328 through control valves 322 and 326.

Steamed catalyst particles are introduced into a surge hopper 332 by means of inlet conduit 328. Catalyst is removed from the surge hopper 332 at the lower end through an outlet conduit 364. The surge hopper 332 has an upper cylindrical section 340 and a lower conical section 360. Looking next at the flow of catalyst particles through the surge hopper 332, conduit 328 passes catalyst to the surge hopper 332. The catalyst particles distribute generally uniformly in a cylindrical catalyst bed 334 called the surge bed. The surge bed 334 provides a surge capacity of partially regenerated catalyst between the regeneration vessel 64' and the stacked reactor arrangement 32' of dehydrocyclodimerization reactors. The upper portion of the surge bed 334 is formed by an internal cylindrical partition 338 and an annular baffle 346. The internal cylindrical partition 338 is concentric with the surge hopper 332. Internal cylindrical partition 338 does not permit the passage of catalyst particles therethrough and also does not allow gas to pass therethrough, except in two locations which are described hereinafter. Internal cylindrical partition 338 is attached to the top head of the surge hopper 332 and extends downward therefrom to a point slightly above the connection of the outlet conduit 364 at the bottom of the conical section 360.

The lower portion of the bed 334 is open to allow catalyst particles to empty from the surge bed 334 into a cylindrical bed 336, called the drying bed and where drying of the catalyst particles occurs. The catalyst particles reach drying bed 336 through a cylindrical opening 335 formed by the lower cylindrical section of the annular baffle 346. The upper portion of the bed 336 is formed by the wall of the internal cylindrical partition 338, and the lower portion of the bed 336 is formed by an annular baffle 352. The lower portion of the bed 336 is open to allow catalyst particles to empty from the catalyst bed and into an internal outlet conduit 356. The bottom of the internal cylindrical partition 338 is closed by a lower end closure 354, which is preferably a conical or elliptical head which is attached circumferentially around the lower circumference of the internal cylindrical baffle 338. The catalyst particles leave bed 336 through the conduit 356, which extends through the lower end closure 354. The catalyst particles in the bed 336 are statically supported by catalyst particles that extend through the internal outlet conduit 356 and that empty into a catalyst bed 358. Catalyst bed 358 is formed by the wall of the lower section 360 of the surge hopper 332. The catalyst particles in bed 358 leave the surge hopper through the conduits 364 and 10'.

Looking next to the flow of gas streams to and from the embodiment in FIG. 2, a stream of compressed and dried air enters through the line 222' and combines with a stream of compressed and dried nitrogen which enters the process through a line 325. A combined stream of compressed and dried air and nitrogen flows through a conduit 311 and enters the regeneration vessel 64' through the conduit 311 to the annular chamber 96'. The relative flow rates of nitrogen through the conduit 325 and of air through the conduit 222 are controlled by means not shown in order to maintain a desired oxygen concentration of the recycle gas in the conduit 86' and in order to maintain a desired mass flow rate for cooling in cooling bed 94'. At the bottom of the cylindrical section of the annular baffle 98', the air-nitrogen mixture reverses direction and flows nearly uniformly upwardly in a counterflow manner through the cooling bed 94'. The ratio of the thermal flow rate of the air-nitrogen mixture to the thermal flow rate of the catalyst particles is less than 0.9 or greater than 1.15, and preferably it is less than 0.85 and greater than 1.20. When the air-nitrogen mixture reaches the top of bed 94', the mixture enters into an open chamber 84' defined by the inner wall of the inner retention screen 74'. The bottom 90' of the inner retention screen 74' is open to allow all of the air-nitrogen mixture from the bed 94' to enter the space 84'. Thus, all of the air-nitrogen mixture leaving the top of bed 94' mixes with the flue gas flowing radially inward through the inner retention screen 74'.

In the steaming bed 319, a steam-containing stream enters the bed 319 through the conduit 188' to an annular space 317. The inlet stream to the steaming bed 319 may comprise steam or a steam-diluent mixture, as previously described. The steam-containing inlet stream is distributed downwardly through the annular space 317, reverses direction, and flows inwardly and upwardly through the steaming bed 319. The steam that reaches the top of the steaming bed 319 is restricted from passing upwardly into the catalyst bed 94' by the packed bed of catalyst in the annular bed 314. The pressure difference between the annular chamber 96' and the annular chamber 312 is measured by a differential pressure instrument (not shown) and is regulated by a control valve (not shown) in the conduit 313 to ensure that the net gas flow through the annular bed 314 is downward. So, the steam that reaches the top of the steaming bed 319 exits through the conduits 313 and 315 and is rejected from the process.

Looking next to the surge hopper 332 and its drying bed 336, a stream comprising heated dried compressed air enters the drying bed 336 through the conduit 206 to an annular space 350. The conduit 206 passes through the wall of the upper section 340 and passes through an annular space 342 which is formed in part by the outer surface of the internal cylindrical partition 338 and the inner surface of the wall of the upper section 340. The conduit 206 does not discharge any air into the annular space 342, but instead extends through the wall of the internal cylindrical partition 338, allowing the conduit 206 to discharge only into the annular space 350. The inlet air stream is distributed downwardly through the annular space 350, reverses direction, and flows inwardly and upwardly into the drying bed 336. In principle, the air that reaches the top of the drying bed 336 could flow through the cylindrical bed 335 and into the surge bed 334, since, as described above, catalyst particles reach drying bed 336 from surge bed 334 by passing through the cylindrical bed 335. Preferably, however, the restriction to gas flow through the packed catalyst bed 335 and through the control valves 326 and 322 is relatively large so that most of the air that reaches the top of the drying bed 336 exits through an annular space 348 and the conduit 344. The conduit 344, which withdraws air from the annular space 348 within the internal cylindrical partition 338, extends from the wall of the internal cylindrical partition 338 and through the wall of the upper section 340 of the surge hopper 332. Thus, conduit 344 does not discharge any gas into the annular space 342. After exiting the surge hopper 332, the conduit 344 connects with the conduit 313, and thus the gas flowing through the conduit 344 flows through the conduit 315 and is rejected from the process.

Also in the surge hopper 332, gas flows through the catalyst bed 358 and the annular space 342. There is a net downward flow of air from the bed 336 to the bed 358 via the conduit 356. The air that exits conduit 356 flows through bed 358 and upward into annular space 342. In order to ensure that air and catalyst particles flow cocurrently downward through the conduit 356, the pressure difference between annular chamber 350 and annular space 342 is measured by a differential pressure instrument (now shown) and is regulated by a control valve (also not shown) in the conduit 344. In addition, a purge stream comprising nitrogen enters the process through a line 362, flows upwardly through the conduit 364, and enters the lower section 360 of the surge hopper 332. The nitrogen passes through the conduit 364 and the bed 358 countercurrently to the movement of the catalyst particles. The flow rate of nitrogen supplied through the conduit 362 is sufficient to purge air from the voids or interstitial volume between the downflowing catalyst particles. A mixture of nitrogen and purged air reaches the top of the catalyst bed 358, flows upwardly through the annular space 342, and is withdrawn from the surge hopper 332 through a conduit 330. Conduit 330 is routed from the annular space 342 of the surge hopper to the annular chamber 317 within the regeneration vessel 64'. The nitrogen-air mixture entering from the conduit 330 flows downwardly through the annular space 317, upwardly through the steaming bed 319, radially outward through the annular space 312, and finally from the regeneration vessel 64' via the conduit 313. Thus, the conduit 313 carries from the steaming bed 319 not only steam but also nitrogen and air in order to reject them from the process via the conduit 315.

The following examples are presented to illustrate this invention and are not intended as undue limitations on the generally broad scope of the invention as set out in the appended claims.

EXAMPLES

In several of the examples, deionized (hereafter DI) water is used. The DI water was produced in a deionization system in the following manner. City water passed through a water softening bed to remove cations such as calcium and magnesium ions by exchanging with sodium ions. After softening, the water passed through a carbon filter to adsorb chlorine and chlorine-containing compounds by adsorption. The filtered water passed through a membrane-containing reverse osmosis unit for removal of dissolved solids, which were rejected in a concentrate stream. The reverse osmosis unit also removed sodium carbonate, organics, and bacteria from the filtered water. After reverse osmosis, the water passed through a separate cationic resin bed and a separate anionic resin bed. The function of the separate cationic resin bed was to remove mainly sodium cations, but also magnesium and calcium cations, and the separate anionic resin bed functioned to remove anions, such as sulfates, carbonates, and nitrates. The water from the separate cationic and anionic resin beds passed through a bed of mixed cationic (60% by weight of the total mixed bed) and anionic (40% by weight of the total mixed bed) resins in order to further remove cations and anions, thereby producing the deionized water that was used in these examples. Persons of ordinary skill in the art of water treatment are familiar with these various deionization steps in the deionization system. A typical analysis of DI water produced by the deionization system is shown in Table A.

TABLE A

| Typical Deionized Water Analysis | |
|---|---|
| pH using combination pH electrode | 5.8 |
| Total nitrogen by potentiometric titration, mass-% | <0.01 |
| Total organics by potentiometric titration, micrograms/ml | <5 |
| Total sulfur by X-ray fluorescence, mass-ppm | <10 |
| Total chloride by potentiometric titration, mass-ppm | 1 |
| Magnesium by ICP, mass-ppm | 0.005 |
| Iron by ICP, mass-ppm | 0.005 |
| Copper by ICP, mass-ppm | 0.003 |
| Sodium by ICP, mass-ppm | 0.015 |
| Calcium by ICP, mass-ppm | 0.29 |
| Silicon by AAS, mass-ppm | <5 |
| Aluminum by ICP, mass-ppm | 0.005 |
| Gallium by AAS, mass-ppm | <5 |
| Phosphorous by ICP, mass-% | <0.05 |

As used herein, the abbreviation "ICP" means induction coupled plasma by emission spectroscopy, and the abbreviation "AAS" means atomic adsorption spectrophotometry.

Examples 1 and 2 show the effect of hydrogen deactivation on the propane conversion by a dehydrocyclodimerization catalyst.

Example 1

This example describes the typical preparation of a dehydrocyclodimerization catalyst. A first solution was prepared by adding phosphoric acid to an aqueous solution of hexamethylenetetraamine (HMT) in an amount to yield a phosphorus content of the finished catalyst equal to about 7.3–7.4 weight percent. A second solution was prepared by adding a ZSM-5 type zeolite to enough alumina sol, prepared by digesting metallic aluminum in hydrochloric acid, to yield a zeolite content in the finished catalyst equal to about 67 weight percent. These two solutions were commingled to achieve a homogeneous admixture of HMT, phosphorus, alumina sol, and zeolite. This admixture was dispersed as droplets into an oil bath maintained at about 100° C. (212° F.). The droplets remained in the oil bath until they set and formed hydrogel spheres. These spheres were removed from the oil bath, water washed, air dried, and calcined at a temperature of about 566° C. to about 760° C. (1050° F. to 1400° F.). A solution of gallium nitrate was utilized to impregnate the spheres to achieve a gallium content on the finished catalyst equal to about 1 weight percent. After impregnation, the spheres were dried, heated in the presence of air and steam, and heated in pure hydrogen at 580° C. (1076° F.) for 6 hours. Then the spheres were heated in air, in the presence of about 20% steam, at a temperature of about 607° C. (1125° F.) for about 1.5 hours. The spheres were then washed according to the following circulating wash procedure.

Circulating Wash Procedure: A quantity of spheres of between about 250 and about 500 cc was added to a vertically-oriented, cylindrical glass column having an inside diameter of between about 1.0 in (2.5 cm) or about 2.0 in (5.0 cm) to form a cylindrical bed of spheres within the column. The column was equipped with a jacket that surrounded the column and through which a heat transfer fluid containing ethylene glycol was circulated. A container maintained an inventory of the heat transfer fluid that was kept at a constant, controlled temperature of about 91° C. (196° F.), and the heat transfer fluid circulated from the container to the jacket and back to the container. After the spheres were loaded into the column, the heat transfer fluid was circulated for approximately 20 minutes so that the temperature of the bed attained a temperature of approximately 88° C. (190° F.). Ammonium nitrate was dissolved in DI water in a reservoir and mixed well for about 15 minutes to form approximately a 2.2 M ammonium nitrate aqueous solution (15% ammonium nitrate by weight). A wash pump was started and the solution was pumped through a heat transfer coil and into the bottom of the column, filling the column in about 7 minutes. The heat transfer coil was immersed in the heat transfer fluid container to help insure that the temperature of the solution entering the bottom of the bed was approximately the same as the temperature of the heat transfer fluid. Once the solution had filled the column, the solution leaving the top of the bed was routed to the reservoir, from which it was recirculated by the wash pump through the heat transfer coil and to the bottom of the bed. The solution circulated upward through the bed for about 5 hours at a rate targeted to attain a linear velocity of about 5 cm per minute. Then, the solution circulation was stopped and the solution was drained from the column. The draining was accelerated by reversing the direction of pumping by the wash pump, so that the drain time was about 7 minutes. During draining of the solution, the heat transfer fluid in the jacket was drained also. After draining of the solution, the direction of flow through the wash pump was returned to its original direction, and the wash pump was used to pump DI water upward into the column, filling the column in about 7 minutes. Once the DI water had filled the column, the flow of DI water into the column was stopped and the DI water sat in the column for 30 minutes. Then the DI water was drained from the column. Most of the spheres were emptied from the column into a plastic bag, and compressed air was used to blow the remainder of the spheres, which had stuck to the inside wall of the column, into the bag.

After the circulating wash procedure, the spheres were finally heated in air without any added steam at a temperature of about 607° C. (1125° F.) for about 1.5 hours. A catalyst that was generally prepared according to this typical procedure was identified as Catalyst A.

The following test procedure was used to evaluate the dehydrocyclodimerization activity of Catalyst A. Catalyst A was loaded into a reactor, and the catalyst was heated in the presence of nitrogen to a temperature of 542° C. (1008° F.) at an approximate rate of from about 28° C. (50° F.) per hour to about 56° C. (100° F.) per hour. A feedstock of propane flowed through a reactor containing Catalyst A. The propane flowed through the reactor at a weight hourly space velocity of 1.1 hr$^{-1}$ under a pressure of 15 psi(g) and at a reactor inlet temperature of 542° C. (1008° F.). The conversion of propane to aromatics at a fixed time after the start of the testing was calculated to be 66.8+/−3.7%.

Example 2

A catalyst was generally prepared according to the typical procedure described in Example 1. A batch of this catalyst was aged at an accelerated rate by contacting the batch with a hydrogen gas, which had a concentration of hydrogen of greater than 99.9 mol-% $H_2$, at a pressure of 1 atmosphere, a temperature of 580° C. (1076° F.), and a gas hourly space velocity (GHSV) of 425 hr$^{-1}$ for a period of 100 hours.

After the accelerated aging, the catalyst batch was heated in the presence of nitrogen and then in the presence of air as follows. The flow of the hydrogen gas was halted and a flow of nitrogen through the catalyst batch was started. The catalyst batch was cooled to 482° C. (900° F.) and held at 482° C. (900° F.) for 30 minutes. Then the flow of nitrogen was stopped and a flow of air through the catalyst batch was started. The catalyst batch was then heated to 566° C. (1050° F.) and held at 566° C. (1050° F.) for 2 hours. Then the catalyst batch was cooled to 93° C. (200° F.). The catalyst that was generally prepared according to this typical procedure was identified as Catalyst B.

A sample of Catalyst B was tested for dehydrocyclodimerization activity according to the test procedure described in Example 1. The conversion of propane to aromatics at the fixed time after the start of the testing was calculated to be 44.9%.

Thus, a comparison of Examples 1 and 2 shows that hydrogen deactivation caused propane conversion to decrease from 66.8% to 44.9%.

Examples 3 and 4 show that washing of catalyst that has been hydrogen deactivated has a beneficial effect on catalyst performance as measured by propane conversion.

Example 3

A number of catalysts were prepared according to the typical preparation procedure described in Example 1. Each of these catalysts was then aged according to the typical accelerated aging procedure described in Example 2. After the accelerated aging, each of these catalyst was then heated in the presence of nitrogen and then heated in the presence of air according to the procedure described in Example 2. Then each of these catalysts was washed with water according to the circulating wash procedure or the dunk wash procedure. The circulating wash procedure was the same as that described in Example 1, except that for all catalysts DI water instead of an ammonium nitrate aqueous solution was circulated through the bed, and for some catalysts the temperature of the heat transfer fluid was such that the bed temperature was 32° C. (90° F.) instead of 88° C. (190° F.).

Dunk wash procedure: A reservoir containing about 600 cc of deionized (DI) water was heated to the desired water wash temperature. A quantity of catalyst of between about 250 and about 500 cc was added to the reservoir. Less than 5 seconds after the catalyst was added to the reservoir, the entire contents of the reservoir were dumped onto a screen in order to separate the catalyst from the wash water and to drain the wash water from the catalyst.

The wash water after a typical 5-hour circulating wash procedure was analyzed to determine what elements were present. Typical analyses of the wash water are presented in Table B.

TABLE B

| Typical Wash Water Analysis | |
|---|---|
| Sodium by ICP, mass-ppm | 11 |
| Calcium by AAS, mass-ppm | 3 |
| Silicon by ICP, mass-ppm | 160 |
| Aluminum by ICP, mass-ppm | 2 |
| Gallium as $Ga_2O_3$ by X-ray fluorescence, mass-ppm | <5 |

As Tables A and B show, some species that appear to have been removed by the water wash comprise sodium, calcium, silicon, and aluminum.

After either the circulating wash procedure or the dunk wash procedure, the washed and still-wet catalyst was loaded into ceramic dishes which were placed in a muffle oven. The door of the oven was closed and a bleed of air at a rate of approximately 2 standard cubic feet per minute (SCFM) (3.2 $Nm^3$/hr) was passed through the oven. The temperature within the oven was raised at a rate of about 5° F. (2.8° C.) per minute to 250° F. (121° C.), held at 250° F. (121° C.) for 1 hour, raised at about 5° F. (2.8° C.) per minute to 500° F. (260° C.), held at 500° F. (260° C.) for 1 hour, raised at about 5° F. (2.8° C.) per minute to 750° F. (399° C.) held at 750° F. (399° C.) for 1 hour, and raised at about 5° F. (2.8° C.) per minute to 900° F. (482° C.). Then, for those catalysts that were heated to only 900° F. (482° C.), the temperature was held at 900° F. (482° C.) for the desired time. But for those catalysts that were heated to 1050° F. (566° C.), the temperature was held at 900° F. (482° C.) for 1 hour, raised at about 5° F. (2.8° C.) per minute to 1050° F. (566° C.), and held at 1050° F. (566° C.) for the desired time. After the desired time at the desired temperature, the oven was turned off, the oven door was opened, and the catalyst was allowed to cool.

After the catalyst was cool, samples of the catalysts were tested for dehydrocyclodimerization activity according to the test procedure described in Example 1. For each catalyst sample, the conversion of propane to aromatics at the fixed time after the start of the testing was calculated and is summarized in Table C.

TABLE C

| Catalyst | B | C | D | E | F | G |
|---|---|---|---|---|---|---|
| Water Washing: | | | | | | |
| Procedure | NA | Dunk | Circ | Dunk | Circ | Circ |
| Temperature, ° F. | NA | 90 | 90 | 190 | 190 | 190 |
| Time, hours | NA | NA | 5 | NA | 5 | 5 |
| Heating: | | | | | | |
| Temperature, ° F. | NA | 1050 | 900 | 900 | 1050 | 1050 |
| Time, hours | NA | 2 | 2 | 5 | 2 | 5 |
| Propane Conversion, % | 44.9 | 63.2 | 63.2 | 60.7 | 69.2 | 63.7 |

KEY:
NA = Not Applicable
Dunk = Dunk Wash Procedure
Circ = Circulating Wash Procedure Thus, a comparison of Catalysts C, D, E, F, and G with Catalyst B shows that water washing improves the propane conversion of all of the washed catalysts over that of Catalyst B by from about 35 percent to about 54 percent.

Example 4 shows that treating catalyst that has been hydrogen deactivated with a mixture of air and steam can have a beneficial effect on catalyst performance as measured by propane conversion.

Example 4

A number of catalysts were prepared according to the typical preparation procedure described in Example 1. Each of these catalysts was then aged according to the typical accelerated aging procedure described in Example 2. After the accelerated aging, each of these catalysts was then heated in the presence of nitrogen and then heated in the presence of air according to the procedure described in Example 2. Then each of these catalysts was steamed according to the following steaming procedure.

A quantity of catalyst of between about 100 to about 200 cc was added to a vertically-oriented, cylindrical glass tube having an inside diameter of about 4 in (10 cm) to form a cylindrical bed of catalyst within the tube. The tube was placed within a vertically-oriented, cylindrical electrical furnace equipped with temperature controllers. The tube was equipped with an inlet connection at its upper end for introducing and regulating the flow of air, steam, or both. The tube was also equipped with an outlet connection at its lower end for venting air or steam that had passed through the catalyst bed. Since the outlet connection of the tube was vented to the atmosphere, the steaming was done at essentially atmospheric pressure. Compressed and dried air was passed through the catalyst bed at a gas hourly space velocity (GHSV) of about 425 $hr^{-1}$ or less, and the furnace was heated at a rate of approximately 1.4° C. (2.5° F.) per minute to the desired catalyst bed temperature. Once the desired temperature was attained in the catalyst bed, deionized water was injected into a preheat coil, was vaporized in the coil, and was passed to the inlet connection of the tube at a rate so as to attain a desired steam content by weight in a combined stream of air and steam flowing through the catalyst bed. The desired catalyst bed temperature and steam content were maintained for the desired period of time. During this desired time period, the GHSV of the steam/air mixture through the catalyst bed was about 425 $hr^{-1}$. At the end of the desired period of time, the injection of vaporized deionized water to the catalyst bed was stopped, and the flow of air through the catalyst bed was continued. The catalyst bed was allowed to cool to a temperature of about 93° C. (200° F.) at a rate of about 1.4° C. (2.5° F.) per minute, and the catalyst bed was maintained at about 93° C. (200° F.) for an hour. Then, the catalyst was unloaded from the tube.

After the catalyst was cool, samples of the catalysts were tested for dehydrocyclodimerization activity according to the test procedure described in Example 1. For each catalyst sample, the conversion of propane to aromatics at the fixed time after the start of the testing was calculated and is summarized in Table D.

TABLE D

| Catalyst | B | H | I | J | K | L | M | N |
|---|---|---|---|---|---|---|---|---|
| Steaming: | | | | | | | | |
| Temperature, ° F. | NA | 900 | 300 | 300 | 900 | 600 | 900 | 300 |
| Time, hours | NA | 2 | 5 | 2 | 5 | 3.5 | 2 | 2 |
| Steam, mass-% | NA | 10 | 85 | 10 | 10 | 47.5 | 85 | 85 |
| Propane Conversion, % | 44.9 | 59.0 | 59.1 | 55.2 | 48.4 | 44.2 | 29.3 | 60.0 |

KEY:
NA = Not Applicable

Thus, a comparison of Catalysts H, I J, K, and N with Catalyst B shows that treating hydrogen deactivated catalyst with a mixture of air and steam improved the propane conversion of each catalyst by from about 8 percent to about 34 percent. Catalysts L and M show by comparison that the benefit of the steaming treatment is greatest at relatively lower temperature and relatively higher steam content.

Example 5 shows that treating catalyst that has been hydrogen deactivated with 100% steam can have a beneficial effect on catalyst performance as measured by propane conversion.

Example 5

Three catalysts were prepared according to the typical preparation procedure described in Example 1. Each of these catalysts was then aged according to the typical accelerated aging procedure described in Example 2, except that the hydrogen gas contacted the catalyst for a period of 100 hours. After the accelerated aging, each of these catalysts was then heated in the presence of nitrogen and then heated in the presence of air according to the procedure described in Example 2. Then each of these catalysts was steamed according to the following steaming procedures.

A quantity of between 300 to 400 cc of catalyst was added to a vertically-oriented, cylindrical, metallic tube having an inside diameter of about 1.3 in. (3.3 cm) to form a cylindrical bed of catalyst within the tube. The tube was placed inside a muffle oven equipped with temperature controllers. The tube was equipped with an inlet connection at one end for introducing and regulating the introduction of nitrogen or steam. The tube was also equipped with an outlet connection at its other end for venting nitrogen or steam that had passed through the catalyst bed. The outlet connection of the tube was connected to a pressure regulator, which allowed the steaming to be done at a pressure that was greater than atmospheric pressure. Compressed and dried nitrogen air was passed through the catalyst bed. The muffle oven was heated at a rate of from about 17° C. (30° F.) per hour to about 33° C. (60° F.) per hour to attain a desired catalyst bed temperature of about 127° C. (260° F.). Once the desired temperature was attained in the catalyst bed, nitrogen flow to the reactor was stopped, and deionized water was injected through a heat exchanger that produced steam at 241 kPa(g) (35 psi(g)). The steam was introduced to the tube at a GHSV of about 400 hr$^{-1}$ for about 72 minutes, while the pressure within the tube was controlled at about 138 kPa(g) (20 psi(g)). The temperature of the catalyst bed during the introduction of steam ranged from about 127° C. (260° F.) to about 128° C. (264° F.). Then, the steam injection was stopped, the oven was turned off, and nitrogen was passed through the catalyst bed at a GHSV of about 100 hr$^{-1}$ for about 72 minutes at a pressure within the tube of about 138 kPa(g) (20 psi(g)). The catalyst that was unloaded from the tube had an LOI of 23.6 wt-% and was referred to as Catalyst O.

Another quantity of between 300 to 400 cc of catalyst was steamed according to the general procedure for Catalyst O, except that the time period for the steaming was 60 minutes, instead of 72 minutes, and the temperature of the catalyst bed ranged from about 51° C. (124° F.) just prior to introduction of the steam, to about 171° C. (340° F.) just after the introduction of the steam, to about 127° C. (260° F.) at the end of the steaming. Another difference from the procedure used for Catalyst O is that, after steaming, nitrogen was passed through the catalyst bed at a GHSV of about 400 hr$^{-1}$ for about 10 minutes in order to cool the catalyst to a temperature of about 93° C. (200° F.). The catalyst that was unloaded from the tube had an LOI of 23.6 wt-% and was referred to as Catalyst P.

Another quantity of between 300 to 400 cc of catalyst was steamed according to the general procedure for Catalyst O, except that the time period for the steaming was 60 minutes, instead of 72 minutes, and the temperature of the catalyst bed ranged from about 127° C. (260° F.) just prior to introduction of the steam, to about 193° C. (380° F.) just after the introduction of the steam, to about 143° C. (290° F.) at the end of the steaming. The catalyst that was unloaded from the tube had an LOI of 36.3 wt-% and was referred to as Catalyst Q.

After each of Catalysts O, P, and Q were cool, samples of the catalysts were tested for dehydrocyclodimerization activity according to the test procedure described in Example 1. For each catalyst sample, the conversion of propane to aromatics at the fixed time after the start of the testing was calculated and is summarized in Table E.

TABLE E

| Catalyst | B | O | P | Q |
|---|---|---|---|---|
| Propane Conversion, % | 44.9 | 59.0 | 63.1 | 60.9 |

Thus, a comparison of Catalysts O, P, and Q with Catalyst B shows that treating hydrogen deactivated catalyst with 100% steam can improve the propane conversion of the catalyst. In addition, Catalyst Q shows that a catalyst with an LOI of even as high as 36.3 wt-% shows improved dehydrocyclodimerization performance. It is believed that the performance benefit is not limited to a catalyst having an LOI of 36.3 wt-% or less, and that a catalyst having a higher LOI at 900° C. such as up to and including 50.0 wt-% will also exhibit improved performance.

Example 6 shows that rapid heating of catalyst that has been hydrogen deactivated and then treated with 100% steam does not have a detrimental effect on catalyst performance as measured by propane conversion.

Example 6

Two catalysts were prepared according to the typical preparation procedure described in Example 1. Each of these catalysts was then aged according to the typical accelerated aging procedure described in Example 2, except that the hydrogen gas contacted the catalyst for a period of 100 hours. After the accelerated aging, each of these catalysts was then heated in the presence of nitrogen and then heated in the presence of air according to the procedure described in Example 2. Then each of these catalysts was steamed according to the following steaming procedures.

A quantity of between 300 to 400 cc of catalyst was steamed according to the general procedure for Catalyst Q. The temperature of the catalyst bed was about 194° C. (381° F.) just after the introduction of the steam. The catalyst that was unloaded from the tube had an LOI of 19.9 wt-% and was referred to as Catalyst R.

A quantity of between 300 to 400 cc of catalyst was steamed according to the general procedure for Catalyst Q, except that the muffle oven was left on during the introduction of nitrogen to the catalyst bed. The temperature of the catalyst bed was about 201° C. (394° F.) just after the introduction of the steam, and was about 138° C. (280° F.) during the introduction of the nitrogen. The catalyst that was unloaded from the tube had an LOI of 6.2 wt-% and was referred to as Catalyst S.

After Catalysts R and S were cool, samples of the catalysts were tested for dehydrocyclodimerization activity according to the test procedure described in Example 1, except that the catalyst was heated in the presence of hydrogen to a temperature of 542° C. (1008° F.) at a rate of from about 18° C. (32° F.) per minute to about 23° C. (41° F.) per minute. For each catalyst sample, the conversion of propane to aromatics at the fixed time after the start of the testing was calculated and is summarized in Table F.

TABLE F

| Catalyst | B | R | S |
|---|---|---|---|
| Propane Conversion, % | 44.9 | 62.7 | 60.8 |

Thus, a comparison of Catalysts R and S with Catalysts O, P, and Q shows that when a catalyst that has been hydrogen deactivated and then treated with 100% steam, the catalyst performance, as measured by propane conversion, is not detrimentally affected by rapid heating. It is believed that the absence of a detrimental effect on catalyst performance occurs not only at a rate of heating of up to about 23° C. (41° F.) per minute, but also at even more rapid rates of heating, such as up to and including about 28° C. (50° F.) per minute.

What is claimed is:

1. A method for producing a dehydrocyclodimerization catalyst comprising an amorphous phosphorus-modified alumina hydrogel, the method comprising admixing an alumina hydrosol with a phosphorus-containing compound and a zeolite, commingling the phosphorus-modified admixture with a gelling agent which is hydrolyzable at an elevated temperature, dispersing the commingled admixture as droplets in a suspending medium under conditions effective to transform the droplets into hydrogel particles, aging the hydrogel particles in a suspending medium, washing the hydrogel particles with water, drying the hydrogel particles, calcining the hydrogel particles, depositing a gallium component on the hydrogel particles, treating the hydrogel particles containing the zeolite and the gallium component with a fluid comprising water and having a concentration of total nitrogen of less than 0.01 mass %, and drying the hydrogel particles containing the zeolite and the gallium component to obtain dehydrocyclodimerization catalyst.

2. The method of claim 1 further characterized in that the treating of the hydrogel particles containing the zeolite and the gallium component with the fluid occurs at a temperature of from about 50° C. to about 100° C. and for a time of from about 1 to about 48 hours.

3. The method of claim 1 further characterized in that the treating of the hydrogel particles containing the zeolite and the gallium component with the fluid occurs for a time of less than 5 seconds.

4. The method of claim 1 further characterized in that the hydrogel particles are separated from the fluid and the drying of the hydrogel particles containing the zeolite and the gallium component to obtain dehydrocyclodimerization catalyst occurs at a temperature of from about 500° C. to about 700° C. and for a time of from about 1 to about 15 hours.

5. The method of claim 1 further characterized in that the fluid consists of at least one of an aqueous solution of a weakly acidic ammonium salt and a dilute acid solution.

6. The method of claim 1 further characterized in that the fluid contains a weakly acidic ammonium salt or an acid.

7. The method of claim 6 wherein the weakly acidic ammonium salt is selected from the group consisting of ammonium chloride, ammonium acetate, ammonium nitrate, and mixtures thereof.

8. The method of claim 6 wherein the acid is selected from the group consisting of hydrochloric, acetic, nitric and sulfuric acid.

9. The method of claim 1 wherein the gelling agent is selected from the group consisting of hexamethylenetetraamine, urea, and mixtures thereof.

10. The method of claim 1 wherein the alumina hydrosol comprises a chloride compound and has an aluminum to chloride compound weight ratio of from about 0.70:1 to about 1.5:1.

11. The method of claim 1 wherein the resulting phosphorus-modified admixture has a phosphorus to aluminum molar ratio of from 1:1 to 1:100 on an elemental basis.

12. A method for producing a dehydrocyclodimerization catalyst comprising an amorphous phosphorus-modified alumina hydrogel, the method comprising admixing an alumina hydrosol having an aluminum to chloride compound weight ratio of from about 0.70:1 to 1.5:1 with a phosphorus-containing compound and a zeolite, the phosphorus to aluminum molar ratio in the resulting phosphorus-modified admixture being from 1:1 to 1:100 on an elemental basis, commingling the phosphorus-modified admixture with a gelling agent and spray drying at conditions effective to obtain hydrogel particles, calcining the hydrogel particles, depositing a gallium component on the hydrogel particles, treating the hydrogel particles containing the zeolite and the gallium component with a fluid comprising water and having a concentration of total nitrogen of less than 0.01 mass %, and drying the hydrogel particles to obtain dehydrocyclodimerization catalyst.

13. The method of claim 12 further characterized in that the treating of the hydrogel particles containing the zeolite and the gallium component with the fluid occurs at a temperature of from about 50° C. to about 100° C. and for a time of from about 1 to about 48 hours.

14. The method of claim 12 further characterized in that the treating of the hydrogel particles containing the zeolite and the gallium component with the fluid occurs for a time of less than 5 seconds.

15. The method of claim 12 further characterized in that the hydrogel particles are separated from the fluid and the drying of the hydrogel particles containing the zeolite and the gallium component to obtain dehydrocyclodimerization catalyst occurs at a temperature of from about 500° C. to about 700° C. and for a time of from about 1 to about 15 hours.

16. The method of claim 12 further characterized in that the fluid consists of at least one of an aqueous solution of a weakly acidic ammonium salt and a dilute acid solution.

17. The method of claim 12 further characterized in that the fluid contains a weakly acidic ammonium salt or an acid.

18. The method of claim 17 wherein the weakly acidic ammonium salt is selected from the group consisting of ammonium chloride, ammonium acetate, ammonium nitrate, and mixtures thereof.

19. The method of claim 17 wherein the acid is selected from the group consisting of hydrochloric, acetic, nitric and sulfuric acid.

* * * * *